(12) United States Patent
Holzer et al.

(10) Patent No.: US 7,045,750 B2
(45) Date of Patent: *May 16, 2006

(54) INDUCTION SEAMING TAPES, SYSTEMS AND METHODS

(75) Inventors: Mark R. Holzer, Mason, OH (US); John K. Laub, Lawrenceburg, IN (US); John P. Barber, Dayton, OH (US); Maurice L. Perkins, Palm Coast, FL (US)

(73) Assignee: Nexicor, LLC, Loveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/079,650

(22) Filed: Mar. 14, 2005

(65) Prior Publication Data

US 2005/0173418 A1    Aug. 11, 2005

Related U.S. Application Data

(63) Continuation of application No. 10/449,209, filed on May 30, 2003, now Pat. No. 6,921,886.

(60) Provisional application No. 60/384,523, filed on May 30, 2002.

(51) Int. Cl.
*H05B 6/10*     (2006.01)

(52) U.S. Cl. .................................. 219/634; 219/633

(58) Field of Classification Search .............. 219/634, 219/633, 635, 653, 657, 645, 646; 422/149; 428/344, 200; 156/379, 275.1, 304.4, 272.4, 156/274.2, 275.5, 273.9, 275.7, 274.6, 71, 156/313

See application file for complete search history.

(56) References Cited

U.S. PATENT DOCUMENTS

| | | | |
|---|---|---|---|
| 4,123,305 A | 10/1978 | Krzeszowski | |
| 4,416,713 A | 11/1983 | Brooks | |
| 4,565,728 A | 1/1986 | Gray et al. | |
| 4,610,906 A | 9/1986 | Brooks | |
| 4,646,048 A | 2/1987 | Hunt et al. | |
| 4,749,433 A | 6/1988 | Johnston et al. | |
| 4,846,916 A | 7/1989 | Kobayashi et al. | |
| 4,919,743 A | 4/1990 | Johnston et al. | |
| 5,198,300 A | 3/1993 | Matthews et al. | |
| 5,538,581 A | 7/1996 | Gallant | |
| 5,691,051 A | 11/1997 | Matthews | |
| 5,935,369 A | 8/1999 | Remerowski et al. | |
| 6,007,662 A | 12/1999 | Remerowski et al. | |
| 6,110,565 A | 8/2000 | Matthews | |
| 6,452,817 B1 | 9/2002 | Yasumura | |
| 6,747,254 B1 * | 6/2004 | Kim et al. ................. 219/635 | |

FOREIGN PATENT DOCUMENTS

| | | | |
|---|---|---|---|
| AU | 57288/80 A1 | 4/1980 | |
| EP | 0237657 A1 | 9/1987 | |

(Continued)

OTHER PUBLICATIONS

Zinn, S. et. al., "Coil Design and Fabrication:Basic Design and Modifications", Heat Treatment Jun.

(Continued)

*Primary Examiner*—Quang Van
(74) *Attorney, Agent, or Firm*—Edward K. Welch, II (57) ABSTRACT

The present invention pertains to novel tapes, tools and seaming systems for creating seams of rolled goods, especially carpeting, using induction heating. The present invention also provides improved seaming tapes for use in resistive heating methods.

20 Claims, 5 Drawing Sheets

| | FOREIGN PATENT DOCUMENTS | |
|---|---|---|
| GB | 1499801 | 2/1978 |
| GB | 1507851 | 4/1978 |
| JP | 1200937 A2 | 8/1989 |
| JP | 1203825 A2 | 8/1989 |
| WO | WO 01/83184 | 11/2001 |

OTHER PUBLICATIONS

Zinn, S. et al., "Coil Design and Fabricaton:Part 2, Specialty Coils", Heat Treatment Jun. 1988.

Zinn, S. et. al., "Coil Design and Fabrication:Part 3 Fabrication Principles", Heat Treatment Jun.

* cited by examiner

INDUCTION SEAMING TAPES, SYSTEMS AND METHODS

This application is based upon continuation of 10/449,209 filed on May 30, 2003 now U.S. Pat. No. 6,921,886 and claims priority from U.S. Provisional Patent Application No. 60/384,523. Holzer et. al. filed May 30, 2002.

TECHNICAL FIELD

This invention relates to induction activated seaming tapes, induction seaming systems and methods of seaming using induction for use in association with the formation of bonded seams of "rolled goods" including textiles, fabrics, felt, carpeting, wall coverings, and the like as well as rigid and semi-rigid goods including paperboard, high pressure laminates, and the like.

BACKGROUND OF THE INVENTION

It is well known to attach rolled goods and other rigid and semi-rigid goods to an underlying surface or substrate through any number of traditional methods including mechanical fasteners such as nails, staples, screws, tacks and brads, and chemical fasteners such as adhesives and cements which cure by volatilization of solvents, heat or chemical reaction. Additionally, Remerowski et. al. (U.S. Pat. No. 5,935,369) and Krzeszowski (U.S. Pat. No. 4,123,305) teach methods of bonding rolled goods to a work surface through induction bonding. However, in many applications, especially carpet seaming, it is undesirable to effect a bond between the rolled good and the underlying substrate or intermediate, in the case of a carpet and the intermediate carpet padding, while creating a seam bond between opposing edges of the rolled good or of adjacent pieces of a rolled good. While stitching of seams is common for most rolled goods applications involving fabrics and textiles, stitching is not always practical or possible, especially in applications where the presence of a visible seam would be unsightly as on a large tapestry, canvas or the like.

In order to address concerns relative to seaming of rolled goods without stitching, a number of different technologies and methods have been devised. For example, simple heat activated tapes comprised of a backing and a layer of a hot melt adhesive on one or both sides of the backing have been developed for butt end and overlap seaming, respectively, of generally thinner fabrics and textiles or overlap seaming of thicker fabrics and textiles. These tapes are activated in place by passing a traditional consumer iron over the site of the seam.

The heat of the iron passes through the fabric or textile to the adhesive, melting the same and forming a bond once the heat source is removed and the hot melt allowed to cool. However, care must be taken in forming the seam so as to avoid scorching the fabric or even melting of the fabric (especially in the case of certain fabrics of low temperature synthetic polymers and elastomeric materials) with the hot iron as well as leakage or squeeze-out of the adhesive from the edges of the tape. Furthermore, if adhesive leaks through the seam or bleeds through the rolled good itself and comes in contact with the hot iron, noxious fumes may arise and, more importantly, the iron may no longer be suitable for its traditional use of pressing or ironing articles of clothing and the like.

Figure 1:
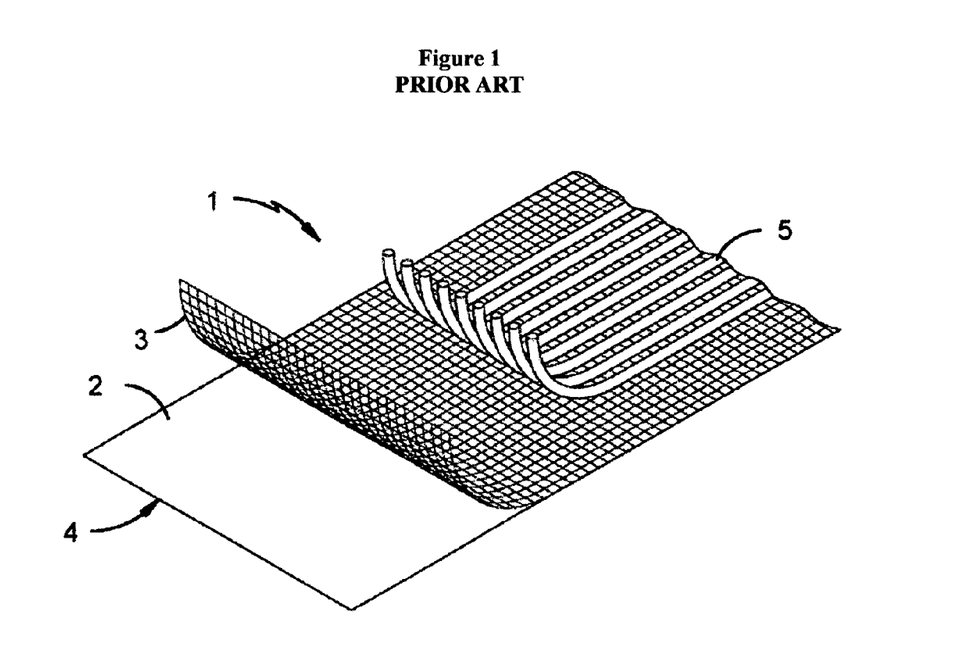
FIG. 1 shows a schematic representation of a conventional carpet seaming tape used with a seaming iron.

The problems associated with the use of adhesive tapes are compounded and magnified in the seaming, particularly butt end seaming, of heavy duty, thick fabrics as used for tapestries and curtains and especially in the seaming of carpets. For convenience, the following discussion will be directed to carpet seaming. Carpet seaming tapes are generally 3–6 inches in overall width and are comprised of a heat-activated adhesive coated in the central 2–5 inches of these tapes, preferably a hot melt adhesive, a reinforcing fabric, and a carrier paper, oftentimes coated with a silicone release coating on the backside. A general schematic of the traditional carpet seaming tape is shown in FIG. 1 where the tape 1 includes a paper backing 2, often creped and frequently coated with silicone release coating on the reverse side 4, a reinforcement strip or scrim 3 for strength and a thermally activatable adhesive 5. Reinforcement strip 3 can be a knit or woven material and may extend to the edge of the tape but is frequently ½ to 1 inch narrower than the paper carrier leaving equal spacing on each edge. The adhesive may be in the form of a layer or beads or a combination thereof, but, in any event, is placed a set distance from the edges of the tape to prevent the molten adhesive from flowing off the tape and inadvertently bonding the carpet to the pad during the heating and subsequent pressing steps. If this should occur, the silicone release coating on the underside of the tape ensures that the tape itself will not bond to the padding, although this will not prevent the back of the carpet adjacent to the tape from bonding to the pad.

This seaming method requires the operator to first place the seaming tape, adhesive side up, directly under the open seam defined by the opposing edges of the carpeting. Once the carpet and tape are properly aligned, the operator then lifts the carpet and inserts a specialized beating iron, whose lower surface is elevated to a sufficient temperature to activate or melt the adhesive, underneath the carpet and in direct contact with the heat activated adhesive of the seaming tape. Once the underlying adhesive has been melted or reacted, the hot iron is advanced along the seam to heat the next section of adhesive. Concurrently, the trailing edges of the carpet behind the iron are brought in contact with the molten adhesive, manipulated to mate opposing edges of the carpeting to match any designs that may be incorporated into the carpet, and then pressed into the molten adhesive to ensure good surface contact and integration of the molten adhesive into the rough surface of the carpet backing. Thereafter, the adhesive is allowed to cool to form the bonded seam. The desired outcome is a seam that is not distinguishable from the rest of the carpet when viewed from the top of the carpet after the carpet has been stretched onto a tack strip or like device that holds the finished carpet in place.

Though the foregoing is the most commonly practiced method of carpet seaming, it is not without its disadvantages. One particular disadvantage is the incidence of peaking of the carpet at the seam once the carpet is stretched. Numerous improvements to the carpet seaming tapes have been proposed for addressing this problem including the use of multiple tapes in a side-by-side relationship (Johnston et. al. U.S. Pat. No. 4,749,433), extra-wide tapes (Johnston et. al. U.S. Pat. No. 4,919,743), and plastic or metallic reinforcing elements (Matthews U.S. Pat. Nos. 5,691,051 and 6,110,565 and Matthews et. al. U.S. Pat. No. 5,198,300). Others have proposed the use of an excess of adhesive at the centerline of the tape. One way in which this has been achieved is through the use of specialized irons that include channels or channeling features on their lower surface which divert molten adhesive so as to create a ridge of excess adhesive directly under the seam. While all of these provide some relief to the peaking problem, they do so at the expense of added costs in relation to the materials and manufacturing of the tapes and/or tools.

While the modified irons would seem a most efficient means to ensure additional adhesive at the seam, they are not without problems and shortcomings. Most notably, if the adhesive is heated significantly above its melting point, its viscosity becomes so low that a substantial amount may flow away from the ridge region as the tool is advanced and before the applicator can properly align and place the carpet edges. Additionally, because the adhesive in the formed ridge area is exposed to the air for the longest period of time, cooling will result in some solidification or viscosity build up in the adhesive in this area so that even if the applicator can ensure that adhesive is present at the interface of the abutting edges, surface wetting may not be sufficient to ensure a strong bond at the interface, i.e., by the time the applicator is able to align and place the carpet edges in proper position and press the same into the adhesive, the adhesive may not be viscous enough to flow into the interface between the abutting edges and/or to develop a sufficiently strong bond with the consequence that when the carpet is stretched the abutting edges separate or open: much like a paper cut opens when one pulls the skin on opposite sides of the cut in opposite directions.

In addition to the foregoing problems, the hot iron method does not allow for ease of redoing a seam once formed. Should the applicator find the pattern is off or that a gap exists in the seam bond, he must employ extreme care in reopening the seam to the point of the problem. In this method, the only way to open the seam is to rip it apart and then strip the tape from the back of the carpet. This process can severely damage the carpet and the carpet backing. Similarly, this method and tool do not allow for simple repairs in the event one needs to replace a small section of carpeting, for example to repair a cigarette burn, or to re-bond a small segment of the seam that has opened due to traffic. In essence, one must open an area sufficiently large to enable the tool to be placed under the carpet and removed. Furthermore, the heat of the tool often causes a relaxation of the twist of the carpet pile resulting in a noticeable difference in the carpet texture at the seam.

Besides the aforementioned difficulties with the process, the hot iron method has a number of additional concerns as well, including health and safety related concerns. For example, the hot iron generates the emission of strong, offensive fumes from the adhesive. Additionally, because the irons, during use, generate a build up of adhesive and adhesive residue on the underside of the iron, i.e., that side in contact with the adhesive, the operator must often raise the temperature of the tool periodically during the seam forming operation in order to ensure good melting/activation of the adhesive. This can even occur during a single seam forming operation where it is not possible to interrupt a seaming operation to remove and clean a tool without seriously risking problems. As noted above, such higher temperatures result in lower viscosities of the adhesives, increasing the likelihood that adhesive will leak beyond the tape edges and bond the carpet and/or the tape to the underlying pad or flooring as well as through the tape backing itself. Additionally, such hot irons can permanently distort the carpet backing as well as the carpet structure itself as a result of scorching or, in the case of polymer based materials, melting and/or relaxation of the carpet fiber twist; cause severe burns in workers who accidentally touch or come in contact with the hot surface of the iron; cause the emission of noxious fumes as a result of the melting and scorching of the adhesive. Additionally, a build up of adhesive and adhesive residue on the iron interferes with the heat transfer from the iron to the adhesive, thus slowing down the overall seaming process and unduly extending the time needed to complete the job.

A number of alternative technologies have been developed in an effort to address some of the problems with the traditional irons and seaming techniques. In particular, concerns relative to adhesive buildup on the iron and the concomitant need for higher temperatures for the iron, and the associated problems with such higher temperatures, are eliminated by seaming methods and devices wherein the heat needed for activating or melting the adhesive is generated within the seaming tape itself and no tools come in direct contact with the adhesive. Additionally, these alternative methods involve tools that do not become excessively hot in use and, thus, concerns for burns to the applicator or the carpet are not an issue. Further these alternative technologies do not involve the use of tools which travel beneath the carpet and above the seam tape, thus making the seaming method much easier.

One of the alternative methods involves resistance heating as a means of melting or activating the adhesive. For example, Brooks (U.S. Pat. No. 4,416,713), Middleton (GB 1,499,801) and Rodenbaugh (GB 1,507,851) each teach methods of carpet seaming using electrically conductive seaming tapes, i.e., seaming tapes similar to those used in traditional iron seaming methods except that they have an electrically conductive resistance element incorporated into the tape. In practice, each end of the tape is connected to an electrical current supply source to create a circuit. Heat generated by resistance heating as the current passes through the conductive element then melts or activates the adhesive. This eliminates many of the problems with the hot iron method and device but creates additional problems as mentioned below.

Because the tape is activated for the whole length of the seam at once, special care must be taken to ensure that the whole seam is properly aligned before inducing the current. Any movement of the carpet before the seam is cured or set, even as a result of a misstep by the applicator at or near the seam, may throw the entire seam out of alignment. Additionally, any break in the conductive element in the tape will render the entire length of the conductive seaming tape ineffective. In this respect tears or breaks in the conductive material may occur during the manufacture of the tape, in the course of laying the tape and carpet or as a result of forces pressing down on the tape after its placement, e.g., as a result of a misstep or the placement of a heavy and/or sharp edged article on the seam. More importantly, this method requires costly, bulky and inconvenient current supply equipment capable of generating currents of over 100 amps in order to generate sufficient heat along a lengthy seam to sufficiently heat the adhesive.

To some extent the need for bulky and costly equipment may be addressed by superimposing one strip of the conductive material over another with an intervening electrically insulating material, isolating the one from the other, (Brooks U.S. Pat. No. 4,610,906) or by placing two narrow strips of conductive material in a spaced, side-by-side relationship along the length of the seaming tape (Baxter AU57288/80). In use, a conductive bridge is applied linking each conductive strip to the other at one end of the tape and the leads from the power source are attached to the conductive strips at the opposing end of the tape. Both tapes present problems of manufacture and handling to ensure that the conductive strips do not touch each other. In the latter, the strips must be placed carefully to ensure they do not touch; whereas in the former, care must be taken to ensure that nothing pierces the tape, a happenstance that could create a short through the electrically insulating layer. Furthermore, because the heat generated by the conductive material is fairly constant along the conductive element and across its width (assuming uniformity in the material), the use of thicker regions of adhesive can create problems as the time to melt the adhesive in such regions is longer than in thinner regions. Thus, the adhesive in the thinner regions will achieve a lower viscosity and have a greater tendency to flow before the adhesive in the thicker regions is sufficiently melted to effectively bond the carpet. This can lead to leakage of the adhesive from the seam.

A second alternative carpet seaming technology relies upon induction heating and induction activatable seaming tapes. Induction activatable seaming tapes are similar, in many respects, to the resistance tapes except that heating results from eddy currents and hysteresis effects that are induced in a susceptor material, e.g., a foil layer or strip, upon being exposed to electromagnetic fields. Although Middleton (GB 1,499,801) primarily focused on resistance tapes wherein the conductive medium is a perforated conductive foil, Middleton also indicates that these tapes may be activated by induction. Nakano (EP 0237657) also teaches carpet seaming using induction activatable adhesive tapes that are activatable upon exposure to alternating magnetic fields of high frequency. Finally, Sakai et. al. (JP 1200937 and JP1203825) teach induction heating apparatus and induction carpet bonding methods wherein the induction tool for generating the high frequency magnetic field has three circular coils in a linear relationship corresponding, in use, to the centerline of the seaming tape. It is believed that this technology was commercialized by Hiroshima in Japan; however, it has since been removed from the market due to poor performance and acceptance of the product.

While induction seaming methods as taught in the prior art will address many of the issues and detriments of the iron seaming method and the resistance seaming method, they still have various shortcoming of their own. For example, leakage of activated or melted adhesive from the edge of the tape is still of concern, especially if the adhesive as applied to the tape is close to the edge. More importantly, induction tools and induction activatable tapes taught to date for use in carpet seaming suffer from poor heating in the area of the seam line or centerline. With such tapes and tools, the prominent heating occurs at the edge of the susceptor and not at the centerline of the susceptor. Indeed, the traditional induction tools taught in the aforementioned art provide little, if any, heating at the centerline of the tape due to the fact that the induced electric field and heating is very weak directly under the center of the coil. Since the carpet seam itself overlies the centerline of the tape, that area of the seam that most needs heat to ensure a good bond receives the least amount of heat. Consequently, there can be un-bonded gaps or weaknesses in the seam as a result of incomplete or insufficient heating of the adhesive directly under the seam. Although activation of the induction tool for longer periods of time may allow additional heat to traverse the tape to the centerline, in reality this is not likely to occur to any significant extent since the more ready direction of heat transfer is through the foil to the other layers of the tape and carpet rather than across the thin foil. Consequently, even if such transverse heating were possible, by the time sufficient heat transferred to the centerline area, the other components of the tape and carpeting in contact with those regions of the tape where heating was effected, particularly at or near the edges of the susceptor, would suffer from excessive heating resulting in scorching and burning of the adhesive, other tape components and/or the carpeting. These problems are even further magnified and compounded if the tapes employed thicker adhesive regions in the centerline area.

Thus, there remains a need in the art to design heat activatable tapes that lessen or eliminate the concern for adhesive leakage or squeeze-out, without increasing, or substantially increasing, the costs of the tape.

There also remains a need in the art to design tapes which are readily activatable by induction and provide suitable, durable carpet seams and, in a preferred respect, have thick regions of adhesive in the centerline to enhance butt end bonding and reduce the likelihood of peaking without being concerned that excessive induction times and heat would be needed and without risking scorching or burning of the tape, the carpet backing or even the carpeting itself.

There also remains a need in the art to design induction seaming systems whereby induction tools and tapes are specifically designed for use in combination so as to provide enhanced performance, whether for addressing adhesive leakage or squeeze-out, peaking or merely for improving bonding in the centerline region of the tape without overheating the edges of the tape.

SUMMARY OF THE INVENTION

In one aspect, the present invention provides novel seaming tapes, which may be activated by induction or resistance heating, wherein the incidence of adhesive leak or squeeze-out is greatly reduced if not eliminated. Such seaming tapes include isolated strips of a heat sink material, which may be of the same material as the conductive or susceptor material, which run parallel to each edge of the tape and intermediate the edge of the tape and the susceptor or conductive material which tends to be centered on the tape. Although the strips of the heat sink material may be placed so as to leave a narrow border along the edge of the tape, much as current tapes leave a border to catch squeeze-out adhesive, it is also contemplated that the outer edges of the strips of heat sink material may be coterminous with the edges of the tape. This process results in the relocation of the traditionally hottest part of the induction tape from the edge to a more inward position.

The present invention also pertains to improved seaming methods whereby adhesive leakage or squeeze-out is significantly reduced or eliminated as a result of the use of the foregoing seaming tapes as well as to carpet seaming systems comprising the aforementioned seaming tapes and induction tools designed to operate with said tapes.

In another aspect, the present invention provides novel induction activatable seaming tapes wherein the susceptor layer comprises two electrically isolated, parallel, co-planar susceptor elements that are separated by a gap that essentially, and preferably, corresponds to the centerline of the tape. In a preferred embodiment, the center region of the tape, including the aforementioned gap, is overlaid with a thicker bead or layer of adhesive, as compared to the average thickness of the adhesive across the width of the tape, so as to provide added adhesive to ensure good bonding of the butt ends of the carpet at the seam.

The present invention also pertains to improved seaming methods whereby gaps or weaknesses in the seam bond due to incomplete or insufficient heating of the adhesive directly underlying the seam is eliminated as a result of the use of the foregoing seaming tapes as well as to carpet seaming systems comprising the aforementioned seaming tapes and induction tools designed to operate with said tapes.

In another, yet related aspect of the present invention, there are provided improved conventional induction activatable seaming tapes, without the novel gap mentioned above, wherein the improvement pertains to the inclusion of regions of thicker adhesive in the centerline area of the seaming tape and improved induction tools specially designed for use with such tapes. In following, the present invention pertains to an improved method of carpet seaming using the improved tapes to reduce or eliminate peaking and a double racetrack coil induction tool wherein the coils are side by side, relative to the centerline of the tape and the corresponding axis of the induction tool coil, as compared to prior art multi-coiled tools where the coils are arranged in a linear or in-line relationship relative to the centerline of the tape and the axis of the induction tool.

Finally, in another aspect of the present invention, there are provided seaming tapes having the combined attributes of the above-mentioned tape designs as well as improved methods of seaming using such tapes as well as the seaming systems comprising such tapes and the inductions tools specialized to optimize the performance of those tapes.

The use of these inventions results in improved seam quality without drastically altering the seaming process and, in some instances, reducing costs. Additionally, the seaming methods of the present invention do not produce a significant amount of heat in, on or below the carpet, particularly as compared to the traditional seaming iron method; have reduced odorous emissions overall; and allow for easy bonding from the top of the carpet.

DETAILED DESCRIPTION OF THE INVENTION

In the simplest of terms, the seaming tapes made in accordance with the present invention comprise three key elements, a base layer, one or more susceptor or conductive layers and one or more adhesive layers. For applications needing high strength, particularly transverse strength across the seam, the tape will also include one or more reinforcing layers. It is possible, of course that the reinforcement may itself be integrated into or comprise the base layer. While these very elements form the structure of conventional induction and resistance seaming tapes, the tapes of the present invention differ markedly in terms of the design and construction of the susceptor or conductive layer and, insofar as they pertain to tapes suitable for induction activation, the design or configuration of the adhesive layer(s). The tapes according to the present invention may be one-sided or if used to prepare an overlapping seam or to bond a butt end seam to a substrate, double-sided.

Generally speaking, the tapes have a length and width which characterize the plane of the tape. The height or thickness of the tape is determined by the number of layers making up the tape as well as the thickness of each layer. The overall length of the tape is irrelevant since, typically, tape portions are cut from a spool of tape to fit the specific application. The width of the tape is largely dependent upon the application to which the tape is to be used. For example, for seaming light fabrics, it may be sufficient to employ a tape of about ½ inch width or larger. On the other hand, tapes for heavy-duty applications, e.g., carpet seaming, will be on the order of three to six inches or more. Generally, such tapes would not exceed eight or so inches as the costs associated with such widths make them prohibitively expensive, not to mention the costs of constructing induction tools large enough to activate the tapes. Finally, the tape should be as thin as possible so as to avoid noticeable rises in the fabric, textile or carpeting where the seam is formed as well as to retain flexibility in the tape, especially so that it can be easily inserted into a cut in a carpet for easy repair and to enable sale in coiled form. The tape centerline, as that term is used herein, is the midpoint of the tape across its width. In a seaming operation, the seam to be formed will generally line up directly above the centerline of the tape. In this way, the surface area of the adhesive of the tape is equally apportioned to each end of the fabric, textile or carpeting to be bonded so as to achieve maximum strength and durability in the seam.

As noted above, the seaming tapes are built upon a base layer. Most commonly, this base layer is made of a paper, preferably flat, creped or extensible Kraft paper, or could be formed of any other materials, such as cloth, plastic film, or the like, which currently is used for many seaming tape constructions. The base layer itself may be of a laminate construction comprising multiple layers of the paper or the like as well as incorporating a reinforcing material, e.g., individual fibers (continuous or chopped), a woven or nonwoven fabric or mesh, a screen or other mesh like material, made of natural or synthetic materials including fiberglass, nylon or polyester. The base layer is preferably flexible so as to maintain ease of use and to allow the tape to be coiled.

The adhesive is typically a hot melt adhesive or a reactive hot melt adhesive. Such hot melt adhesives are generally solvent-free adhesives based upon a number of different chemistries including: ethylene vinyl acetate (EVA) copolymers, styrene-isoprene-styrene (SIS) copolymers, styrene-butadiene-styrene (SBS) copolymers; ethylene ethyl acrylate copolymers (EEA); and thermoplastic and reactive polyurethanes. Different hot melt adhesives have different ranges of temperature over which they are activated; however, many are characteristically solid at temperatures below 180 degrees Fahrenheit (° F.) and low viscosity fluids above 180° F. that rapidly set upon cooling. Others have transition temperatures as low as about 150° F.: of course the actual transition temperature of a given hot melt adhesive depends upon the chemistry of that particular adhesive.

Generally speaking, the temperature activation range of a given hot melt adhesive depends upon the ability of the adhesive to wet and flow onto the surface of the adherends under the pressure and temperature conditions of application. This is dependant upon the rheology of the adhesive, which is a function of the chemical composition and molecular weight of its constituents. By selecting and evaluating adhesives that provide end-use performance as required by the application as well as those that have a broad activation range, one can optimize the tape design to achieve the maximum bond area and performance ensuring the greatest factor of safety when used.

Essentially any hot melt adhesive used or known for use in carpet seaming applications can be used in the present invention. Such are well known and widely available. The adhesive is present as a continuous layer of even or varying thickness across the width of the susceptor, as a series of parallel beads and/or strips extending the length of the tape or as a combination of the two. Alternatively, the adhesive may be present as beads, films or adhesive strips in the centerline region of the tape, preferably the centerline and the susceptor edge region of the tape. In the induction activatable tapes, where the adhesive is not present in the susceptor edge region, it is important that the width of the susceptor be significantly wider, generally at least about 1.3 times, preferably about 2 times, wider than the width of the coil to avoid excessive heating at the edge of the susceptor.

As noted, the adhesive may be of uniform or, preferably, varying thickness, with a greater thickness being present in the centerline region. Adhesive profiles (i.e. cross-sectional views) of varying thickness may be achieved by any number of methods, as known to those skilled in the art, including extruding a film or strip of adhesive of the desired profile, by building successive layers of the adhesive at specific locations on a base layer of adhesive or by laying a film of liquid adhesive and using one or more scraper tools having the desired profile on its lower edge. The specific thickness of the adhesive layer will depend upon the intended end use application. Thin films, generally from about 1 to 3 mils may be used for simple bonding of textiles and fabrics; whereas thicker adhesive layers, generally on the order of about 10 to 200 mils, preferably 20 to 140 mils, more preferably 40 to 100 mils, will be needed for heavy duty fabrics, especially carpeting. As noted herein, thicker regions of adhesive may be desirable for certain end-use applications. In the latter, it is desirable to ensure the adhesive is of sufficient thickness so that it will penetrate into the rough underside of the carpet backing and, most preferably, into the carpet seam itself to enhance bonding of the butt ends of the carpeting.

Conductive materials and susceptors suitable for use in the construction of conductive tapes and induction activatable tapes, respectively, are well known. Indeed, for the most part, suitable susceptors, as described below, are also suitable for use as the conductive material for resistance heating applications, and vice-versa. Clearly there are, however, some instances where the two classes do not overlap. For example, extremely thin foils used for induction may not be able to carry the current without burning through the foil in resistance application. The latter may require thicker foils. Similarly, a series of parallel wires or conductive strips of very small width will perform well for resistive applications but will not have sufficient surface area to couple to the coil to enable induction heating. For ease of reference, the two are oftentimes herein referenced as electro-responsive materials.

The width of the electro-responsive material is a matter of the width of the bond line to be formed as well as the method by which it is to be activated. For resistive heating and conductive elements, the width and/or number of conductive elements are gauged by the width of the bond line. On the other hand, for induction applications, the width of the susceptor element or elements must be sufficient that the electromagnetic field generated by the coil of the induction tool used will create eddy currents in the susceptor and that the eddy currents generate sufficient heat, but not excessive heat, to melt the adhesive to form a suitable bond. If the width of the susceptor is too small, there is insufficient width for the eddy currents to form. Even where eddy currents are generated, the width must be sufficiently large to avoid excessive heating at the edges. Thus, proper susceptor width is a matter of coil design and size as well as the width of the bond area to be formed.

Electro-responsive materials suitable for use in the construction of the laminates of the present invention include essentially any structural material capable of absorbing electromagnetic energy and converting such energy to heat. For example, the electro-responsive material may be comprised of a carbon fabric, mesh screen or a metal or metallized material selected from foils, sheets, fabrics and meshes or screens. The foil or sheet may be continuous or solid across its surface or it may have random or patterned slits, punch-outs or cutouts. Metals useful in the preparation of the electro-responsive materials include copper, steel, aluminum and other electrically conductive metals. Generally speaking, the electro-responsive material or electro-responsive layer has a thickness of about 0.01–3 mils (0.00001 inch–0.003 inch) or more, preferably 0.05–2 mils, or most preferably 0.01–1 mils. In the case of eddy current induction, especially when aluminum foil is used, the thickness of the susceptor layer may be somewhat less, from 0.01–2 mils, preferably 0.05–0.75 mils, and most preferably 0.08–0.55 mils. The specific selection of the susceptor material and form of the susceptor material is dependent, in part, upon the type of electromagnetic energy to which the tape is exposed, e.g., low frequency, medium frequency, and high frequency. For convenience, practicality, and safety, heating is preferably developed using low to medium frequency electromagnetic waves (~2 kHz to ~1 MHz) by induced eddy currents alone or in combination with hysteresis heating. In this respect, it is preferred that the susceptor be in the form of a sheet, foil, or mesh, which may be perforated, non-perforated, or patterned, with or without a constant thickness, and made of aluminum.

Additionally, the seaming tapes of the present invention may include a reinforcing layer comprising individual fibers (continuous or chopped), a woven or non-woven fabric, webbing or mesh, or other webbing, mesh or screen like material, made of natural or synthetic materials including fiberglass, nylon or polyester. This reinforcing layer is sewn or bonded into the tape construction to provide lateral strength across the seam.

While many of the materials from which the tapes of the present invention are conventional for conductive and induction activatable seaming tapes, it is the novel orientation and configuration of these elements as taught by the present invention which provide unique and markedly improved seaming tapes, and resultant seams, overcoming many of the short falls of the state of the art resistance and induction seaming tapes. For convenience, the following discussion will be specific to carpet seaming tapes, methods and systems; however, those skilled in the art will readily be able to modify the teachings and principles set forth herein to use the same for seaming most any kind of "rolled goods", including textiles, fabrics, felt, carpeting, wall coverings, and the like, as well as rigid and semi-rigid goods including paperboard, high pressure laminates, and the like. It is understood that the term "rolled goods" is used herein to refer to a general category of goods and is not to be literally construed. While most roll goods are sold in bulk in a roll form, the present invention clearly applies to goods of the type described that are in sheet form as well.

Carpet seaming requires the creation of a band of bond area along the seam line of two pieces of carpet that are being joined. The bond must be essentially continuous along the length of the seam and must be somewhere between about ½ inch and about 4 inches wide. Additional bond areas may be present, for example, there may be a separate bond line along or near the edge of the tape; however, the key bond area is the bond in the centerline area of the tape. Gaps or weak spots in the bond, of significant size, will open up when the seam is stretched and be unsightly in the finished seam as well as result in a seam of poor or low durability. The preferred centerline bond width is between about 1 inch and about 3 inches, most preferably about 2 inches in width. This width provides a good trade between strength (wider is stronger and more durable under foot traffic) and cost (wider uses more adhesive and is therefore more expensive).

Figures 2, 2A:
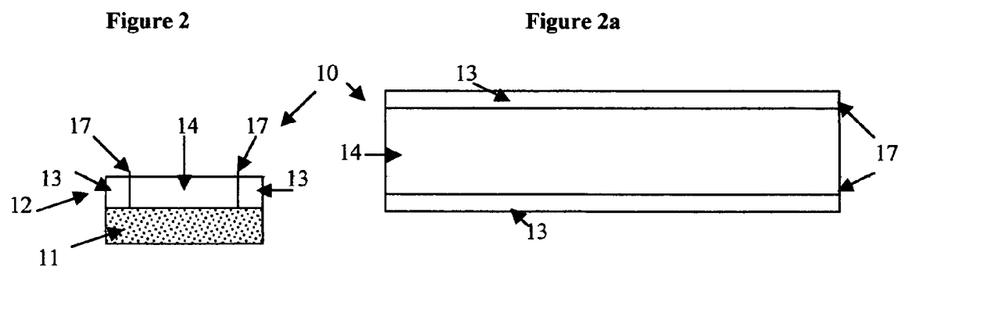
FIG. 2 is a cross-sectional view of the base and electrically active layers of a seaming tape made in accordance with the present invention wherein dead zones are present at the edge of the tape.
FIG. 2a is a top view of the tape foundation of FIG. 2.
Figure 3:
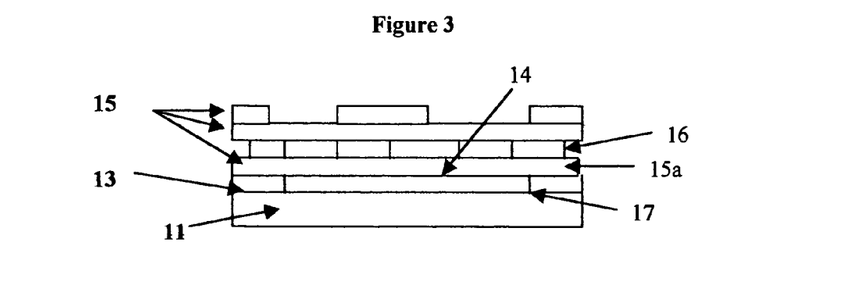
FIG. 3 is cross-sectional view of a completed seaming tape using the tape foundation of FIG. 2.

According to a first embodiment of the present invention, seaming tapes that exhibit a markedly lessened tendency to experience edge leak or squeeze-out of adhesive or that are free of edge leak or squeeze-out can be produced by creating "dead" zones in the susceptor material or introducing a co-planar strip of a damming material between the susceptor material and the edge of the tape, preferably along the edge of the tape. As shown in FIGS. 2 and 2a, the foundation 10 of a seaming tape according to this embodiment of the present invention comprises a base layer 11, generally a strip of Kraft paper, and a susceptor layer 12. The susceptor layer 12 comprises the susceptor element 14 and isolated edge strips 13 isolated by slits 17. The edge strips may be of the same material as the susceptor element or a different material so long as they do not generate or conduct sufficient heat to melt the adhesive when placed in the electromagnetic field. However, it is noted that the material comprising the dam or edge strips, as they are interchangeably referred to in this application, may, in fact, be a heat sink material, i.e., a material that readily absorbs heat from other materials in which it is in contact, so long as it does not conduct enough heat to enable or facilitate the flow of adhesive past the dam to the edge of the tape. Suitable damming materials include high temperature polymers and plastics, preferably elastomeric or flexible in nature, paper or paper-like materials, as well as metal foils, regardless of whether the metal is electrically conducting or non-conducting. As shown in FIG. 3, the seaming tape is completed by the subsequent addition of one or more adhesive layers 15 and, optionally, a reinforcing layer 16, which may be directly adhered to the susceptor layer or applied to an intervening adhesive layer 15a. The uppermost or top layer of the construction is an adhesive layer.

The width of the edge strips is generally less than ½ inch, preferably less than ¼ inch. In any event, the width of the edge strip 13 is such that eddy currents and/or hysteresis heating cannot be achieved in the edge strip sufficient to melt the adhesive when an induction tool, otherwise capable of activating the seaming tape, is centered over the seaming tape and activated. This is generally seen when the width of the edge strips are about ¼ or less the width of the coil of the induction tool.

The seaming tapes of this embodiment may be constructed in different ways. The simplest and most cost effective manner involves the application of the susceptor material over the whole of the surface of the base layer followed by a scoring of the susceptor layer so as to electrically isolate the scored edge strips 13 from the rest of the susceptor 14. Alternatively, the susceptor layer 12 comprises a susceptor element and two edge strips 13 of a damming material that are independently laid on the base layer 11, preferably with a gap between the edge strips and the susceptor element. Depending upon the selection of the material from which the base layer is made, it may be necessary to apply an adhesive to the underside of the susceptor material and/or damming material in order to ensure a strong bond. Additionally, although not necessary, in constructing the tape according to this embodiment, the base layer may be wider than the susceptor layer so as to leave an edge, much like traditional seaming tapes. However, this adds costs and increased difficulty in manufacture due to the use of more material, i.e., a wider base tape, and the need for precision in ensuring that the susceptor layer elements are properly centered on the tape. Such precision may be difficult in high-speed continuous manufacturing operations.

The foregoing discussion just as readily applies to the manufacture and construction of those tapes that are activated by resistance heating as well: the only difference being to ensure that the electro-responsive material is a suitable conductor for the specific application. As with the induction tapes, the key is to isolate a narrow region along each edge that is not electrically activated. As with the susceptor, it may be a matter of scoring (cutting) the edge of a wide conductive foil or the laying of independent damming materials. If a series of inductive elements were laid side-by-side along the length of the tape, one could achieve the "dead zone" effect merely by not attaching the current lead to those conductive elements near the edges of the tape.

Figure 4:
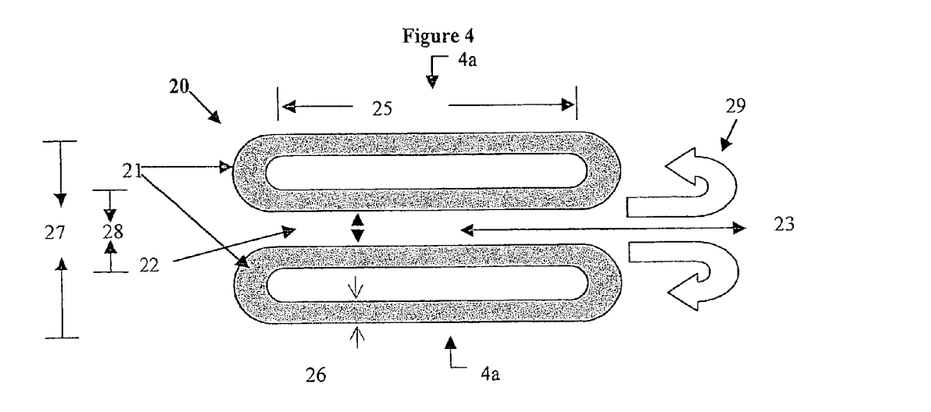
FIG. 4 is a depiction of the footprint of a double racetrack coil.
Figure 9:
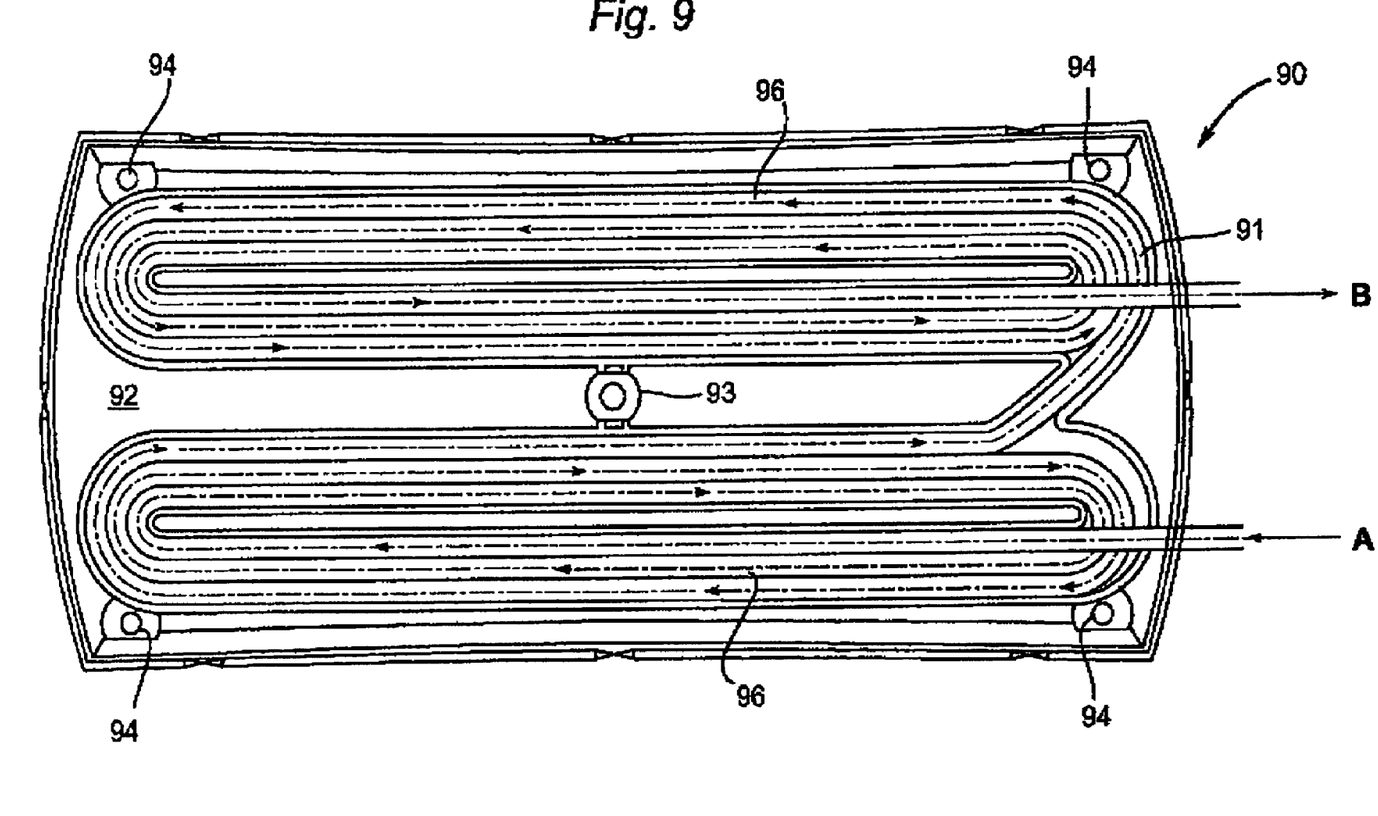
FIG. 9 is a top plan view of a double race track coil element for an induction tool.

The foregoing tapes may be activated by resistance heating, wherein a lead is attached to each end of the tape or, where the tape has two or more conductive elements with a conductive bridge at one end, to each conductive element at the other end and a current passed through the conductive element to heat the adhesive, or by induction. In the later, essentially any type of induction tool may be used to induce activation of the adhesive. Suitable induction tools are described in, for example, Riess et. al. U.S. Pat. No. 6,509,555 and Sakai et. al. JP 1200937. Alternatively, and preferably, the tapes according to this embodiment are induced using induction tools having a "double racetrack" coil, Le, two induction coils, preferably elliptical in shape and of the pancake style, in a side-by-side relationship, each coil, in operation, on opposing sides of the centerline or the seaming tape. A double racetrack, pancake style coil assembly for incorporation into an induction tool, like that of Riess et. al., is shown in FIG. 9. The coil assembly (90) comprises a single conductive element (91). e.g., Litz wire, wound to form two side-by-side, planar, eliptical annals mounted on a base plate (92) that may be attached to an induction tool body (not shown) by connector (93) and alignment means (94). Electric current enter and leaves the coil element (91) through leads A and B, respectively. The current flows through the spiral wound coil element in the direction of the rows. For ease of understanding, FIG. 4 shows the footprint of a double racetrack induction coil 20 having two elliptical coil elements 21 with opposite current flows 29 separated by gap 22 on opposing sides of the central axis 23 of the tool. The functional length 25 of the coil 21 corresponds to that length of susceptor able to be heated to the appropriate temperature by the coil. As discussed further below, the double racetrack coil not only provides excellent heating at the edges of the susceptor element, but also provides marked heating at the centerline of the tape. heating at the centerline of the tape.

Regardless of what tool is chosen, the seam is formed by centering the improved carpet seaming tape below the carpet seam, placing the opposing edges of the carpet in butt end relationship with the seam overlying the centerline of the underlying seaming tape, placing the induction tool over the seam with the central axis of the tool generally overlying the seam, and, thus, the centerline of the tape, activating the tool for a sufficient period of time in order to melt the adhesive on the tape, moving the induction tool forward a distance equal to or less than the functional length of the induction coil to heat the next contiguous section of tape while concurrently pressing the trailing carpet edges into the molten adhesive. Leakage or squeeze out of adhesive is prevented as a result of the "dead" zones. Specifically, in those seaming tape constructions where the adhesive overlies the edge strips, any heat generated in the edge strips and/or conducted through the adhesive from the susceptor element is insufficient to melt the adhesive. Thus, the adhesive overlying the edge strip acts as a dam. Where the adhesive does not overlie the dead zone or only in a minor way, molten adhesive over the susceptor element may flow towards the edges but is quickly cooled and its flow stopped as the heat from the molten adhesive is absorbed by the heat sink.

In addition, this concept allows for the mass production of seaming tapes wherein the foundation of the seaming tape is first produced in wide stock rolls. These stock rolls are then cut to the desired width of the final tape and scored to create the appropriate "dead" zones. For example, a single stock roll of the tape foundation could be formed that is several feet wide and is subsequently cut into individual 3 inch or 4 inch wide tapes. In manufacturing the stock rolls, each layer of material making up the tape foundation is sequentially laid, one upon the other, across the full width of the stock roll. Thereafter, the remaining layers of the tape are sequentially added to cut stock rolls to form the final tape construction. Alternatively, if the stock roll is to be used to manufacture a single width tape, it is possible to complete the build-up of the final tape, before cutting the rolls from the foundation tape, by scoring the bulk roll of the tape foundation and thereafter continuing with the build-up. In this embodiment, each layer, including the adhesive, would run from one edge of the tape to the other. Without the "dead" zones, these tapes would readily ooze adhesive from the edge of the tape. Thus, tapes according to this aspect of the invention provide a number of manufacturing and materials related cost efficiencies as well as addressing the problems of adhesive leakage and squeeze-out.

Figure 5:
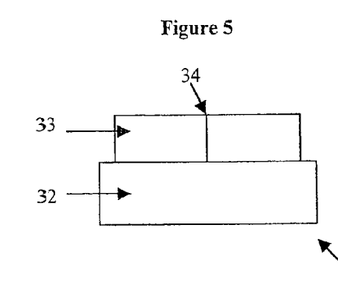
FIG. 5 is a cross-sectional view of the base and susceptor layer of a seaming tape made in accordance with the present invention wherein a gap or slit exists down the centerline of the susceptor layer.
Figure 5A:
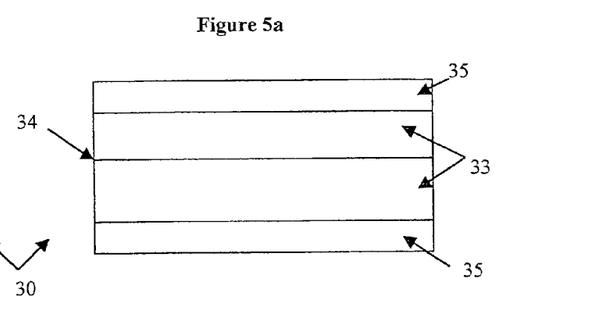
FIG. 5a is a top view of the tape foundation of FIG. 5.
Figure 6:
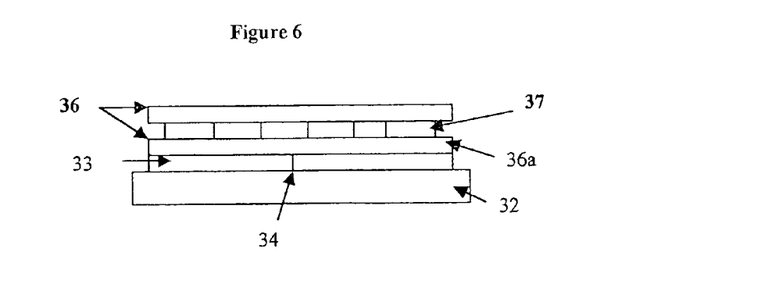
FIG. 6 is a cross-sectional view of a completed seaming tape using the tape foundation of FIG. 5.

In a second aspect of the present invention the susceptor element or layer is scored (cut through) along its central axis, not to prevent melting of the adhesive, but to enhance melting of adhesive in the area proximate to the scoring. FIG. 5 shows a cross section of the foundation 30 of a seaming tape made in accordance with this embodiment of the present invention wherein a susceptor layer 33 is centrally disposed on a base layer 32 whose width is greater than that of the susceptor layer, leaving exposed edges 35 of the base layer to catch any leakage or squeeze out of adhesive. Alternatively, the width of the base layer and the susceptor layer may be the same, especially if the overall width of the susceptor is significantly larger than that of the coil. Critical to this embodiment is the scoring of the susceptor layer along its centerline, forming slit 34 along the length of the tape. The scoring isolates each portion of the severed susceptor element from the other. As shown in FIG. 6, the seaming tape is completed by the subsequent addition of one or more adhesive layers 36 and, optionally, a reinforcing layer 37, which may be directly adhered to the susceptor layer or applied to an intervening adhesive layer 36a. The top or uppermost layer of the construction is an adhesive layer. Alternatively, rather than applying a single susceptor layer and scoring it, one can achieve the same effect by placing two strips of susceptor element in a parallel, co-planar relationship, separated by a minor gap, sufficient just to electrically isolate one from the other.

In a preferred embodiment of this aspect of the invention, the adhesive on the uppermost surface of the seaming tape will be thicker in that region overlaying the centerline of the tape, essentially corresponding to the desired seam bond or bond width. Generally, the width of this region of thicker adhesive overlying the centerline of the tape will be about 3 inches or less, but preferably no less than about ¼ inch in width. However, narrower regions of 2 inches or less, but preferably no less than ½ inch, are more common. The thickness of the adhesive in this region will be from about 40 to 200 mils, preferably from about 50 to 150 mils. This will generally correspond to a thickness of one and one-half to five, preferably two to three, times the average thickness of the adhesive across the width of the tape in those tapes where adhesive covers all or substantially all of the susceptor surface area. Whatever the exact thickness may be, the purpose of this central ridge or strip of adhesive is to provide excess adhesive that flows into the seam providing a strong bond between the opposing butt ends of the carpet so as to avoid peaking when the carpet is stretched. Oftentimes, with thin films of adhesive over the whole of the tape or, especially in the central region, there is insufficient adhesive to flow into the seam and bond the butt ends together. Consequently, when the carpeting is stretched, the seam, or at least the upper portion of the seam may open, causing peaking of the carpet seam. The excess or thicker regions of adhesive are not necessarily limited to the central area of the tape. Such thicker regions may also be employed at the outer edges of the susceptor elements as well as in the central region to provide better overall bond strength across the whole of the seam area, including both the centerline bond area and the edge region.

It is also contemplated that this embodiment of the invention may integrate the "dead" zone concept of the prior embodiment. In this respect, the susceptor layer may be formed by scoring a susceptor element three times: once at the centerline and once at the appropriate distance in from each outer edge of the tape so as to form the edge strips, as taught previously. Alternatively, the tape may be made by laying each edge strip and each susceptor element strip independently or by scoring the centerline of the susceptor element and laying the edge strips independently. Furthermore, where the tape construction employs such "dead" zones, it is not necessary to use a base layer that is wider than the susceptor layer to prevent adhesive from leaking out and bonding the carpet to the underlying substrate.

This aspect of the invention is especially beneficial as it enables the applicator to use traditional induction tools having a single coil or multiple, in-line coils, of the type described in Reiss et. al. and Sakai et. al., respectively.

Suitable coils may be of different shapes, e.g., square, round, oval, elliptical; but in any event must be properly sized so that they produce a heating pattern that is within the desired bond band. Coils of large diameter or width in comparison to the width of the susceptor element in the tapes will result in excessive heating at the edge of the susceptor and, possibly, subsequent scorching and/or degradation of the adhesive, tape, carpet and/or pad. Generally speaking, the width or diameter of the coil will be such that the width of the susceptor will be from about 1.0 to 1.5 times the width of the coil, preferably from greater than 1 to 1.3 times the width of the coil and most preferably about 1.1 to 1.2 times the width of the coil. Here, the width of the susceptor is the combined width of the individual/scored susceptor elements.

This aspect of the present invention allows the construction of seams without concerns that gaps or weak areas in the bond at the seam will appear, particularly where one employs an excess of adhesive in the centerline region. Specifically, the present invention allows for the use of tools that previously provided little or barely sufficient heat at the centerline of conventional, non-scored induction tapes or did produce sufficient heat but also produced gaps along the bondline where the "center" of the wound coil was located during activation. Such tools in combination with the inventive tapes provide more than sufficient heat in the centerline region to melt not only a traditional thickness of hot melt adhesive but an excess of the adhesive as well. In essence, the centerline benefits from the heat of the two opposing edges of the scored susceptor element as compared to the heat of the single edge at the outer edge of the susceptor. Thus, the combination of these new carpet seaming tapes and the traditional induction tools provides a new and useful method of carpet seaming as well as a synergistic carpet seaming system.

The method of use of the tapes and tools of this aspect of the invention are the same as mentioned above for the tapes having the "dead" zones. Specifically, the tape is placed under the carpet with the centerline of the tape corresponding to the seam. The carpet edges are placed together, the tool aligned with the seam and activated for a sufficient period of time to melt the adhesive. Then, the tool is advanced to the next activation site and the trailing seam pressed to force the backing of the carpet into the hot melt adhesive. This process is repeated until the tape seam is completed.

In a third aspect of the present invention, there is provided an improved induction carpet seaming method wherein tapes of the type described above as well as conventional induction activatable carpet seaming tapes may be used in combination with an induction tool having a "double racetrack" coil for providing carpet seams with strong bonds even at the centerline of the tape. This aspect of the present invention also relates to novel tapes and tools specifically designed for use in the aforementioned method.

As discussed earlier, FIG. 4 shows the footprint of a double racetrack coil with its opposite current paths 29. For purposes of exaggerating the opposing flow, the arrows are shown outside of the coil elements 21, when in fact the flow is within the coil elements of the coil 20. Although the particular embodiment shown is of dual elliptical coil elements 21, the coil elements could just as well be of a different shape, e.g., circular, square or rectangular; however, shape may affect the efficacy of the tool, particularly insofar as the shape affects the functional length of the coil, and thus tool. In particular, it has been found that the geometry of the coils affects the heating characteristics for a susceptor of a given width and thickness. The chief variables of the coil geometry are the wire type, total length of wire, winding pattern, and separation between the two lobes of the coil, all of which determine the centerline activation width 28 and the overall coil width 27 as well as the functional length 25 of the tool. The coil length is selected to balance power transfer, activation cycle time, and desired seaming rate. For example, a typical 120V AC powered tool can activate about 1 inch/second of seam tape that is coated with a low melt temperature, hot melt adhesive that is approximately 0.8 mm thick. A coil having a functional length of 8 inches would require about 8 seconds to activate the 8 inches of seam it covers. The cycle time is then about 10 seconds (allowing 2 seconds to move the tool) giving a seaming rate up to 48 inches per minute—a rate very competitive with hot iron seaming which is assumed to be approximately 3 feet per minute.

Figure 7:
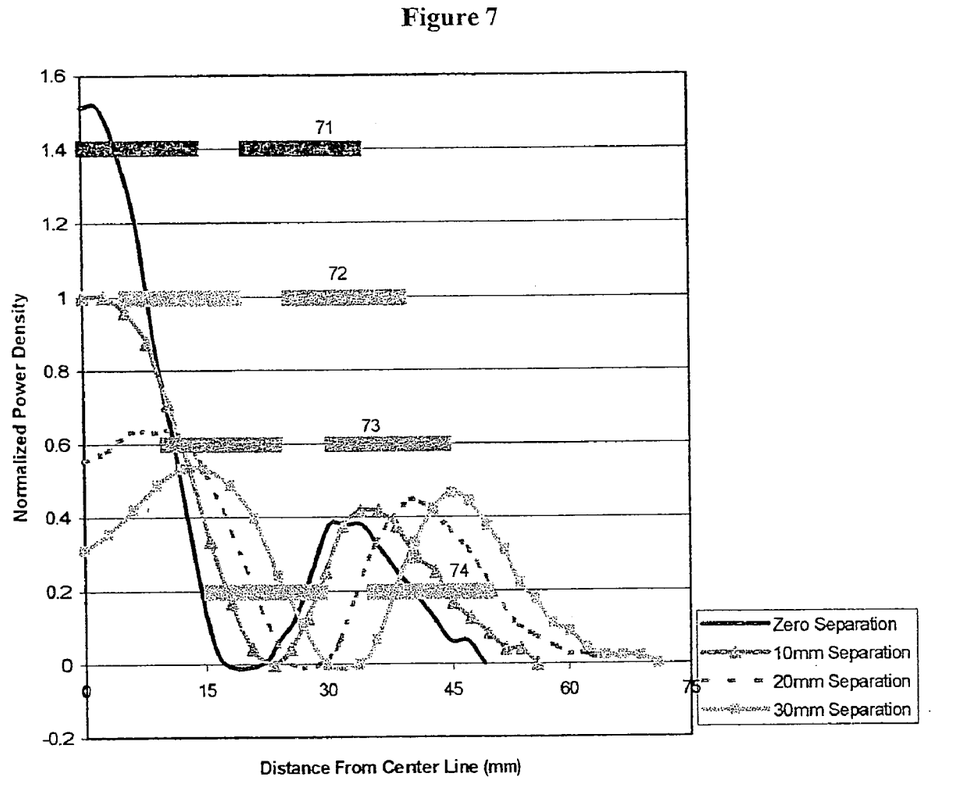
FIG. 7 is a graph showing the normalized power density across one-half of the width of the susceptor (from the centerline to the edge) for four different coil separations.

The coil separation 22 must also be optimized to maximize the width of the heating band or, alternatively, minimize the total coil width while maintaining acceptable heating distribution in the heated band, i.e., the area corresponding to the centerline bond band. The power distribution as a function of separation between the coils is illustrated in FIG. 7. For clarity, the coil winding position, relative to the centerline axis of the tool, is also shown for each designated separation of the coils (71, 72, 73, 74). This corresponds to the cross section of one of the two individual coil elements in FIG. 4 taken along line 4a–4a, with the gap 22 being equal to the specified separation shown in FIG. 7. In FIG. 7, the Power Density axis of the graph corresponds to the centerline of the coil 23 (of FIG. 4). Combining a mirror image of the plot at the power density axis would provide a representation of the power density across the full width of the susceptor.

As seen in FIG. 7, when the coil separation is zero 71, the heating bandwidth is minimum and the power distribution, and therefore the temperature, is greatest at the centerline of the coils. At constant power and energy, we find that as the coil separation is increased the useful heated zone, i.e., that area corresponding essentially to the centerline activation width 28, widens and the magnitude of the heating maximum located at the centerline falls. This manifestation is shown by the plots 72, 73 and 74 for coil separations of 10 mm, 20 mm and 30 mm, respectively. Eventually, the separation grows too large such that heating at the centerline falls to an unacceptably low value, especially for an adhesive of a given type and thickness.

Notwithstanding the foregoing, as discussed below, while coil separations (also referred to herein as "gaps" or "coil spacing") of the widths mentioned above may be preferred for instances where, in use, the tool or coil is properly aligned over the centerline of the tape, such is not always possible. Consequently, although there is a trade off in the power density in the centerline region with wider gaps, such wider gaps also provide an overall wider activation width, as seen in FIG. 7, so that if misalignment occurs, there is still a sufficiently wide seam bond band formed. Of course the gap must not be so great as to result in too little power and poor heating. In this instance, wider coil elements combined with wide, but not excessively wide gaps, can accommodate power needs together with addressing the activation width.

As a consequence of their experimentation, Applicants have designed an induction tool that is especially beneficial for carpet seaming and like seaming applications. As shown in FIG. 4, tools in accordance with this aspect of the present invention have a coil spacing or gap 22 of between 5 and 30 mm, preferably between 10 and 20 mm; a centerline activation width 28, i.e., that distance from the inside edge of one coil loop to the inside edge of the opposing coil loop, of at least about 0.75 inch, preferably at least about 1.0 inch, but generally less than 3 inches, most preferably about 2 inches, and an overall coil width 27 that is less than the width of the susceptor of the tape to be activated and will most likely be of no more than about six inches, preferably no more than about four and one-half inches. In following, the element width 26 of the coil elements will be from about 0.25 to about 0.75 inch, preferably about 0.5 inch. The functional length 25 of the coil, i.e., the straight edge portion of the coil, can vary and is more a function of the economics and power output of the tool as well as the desired speed of the seaming process. Generally speaking, the functional length is between about 2 to 12 inches, preferably from about 4 to 10 inches. Longer functional lengths, though possible, make the tool cost ineffective and more difficult to use, particularly from a hand-held perspective. Shorter functional lengths make the tools difficult to use in that so many more individual advancement and activation steps will be required to bond a seam of a given length.

Seaming tapes to be used with the foregoing double racetrack coils will have a susceptor width that is at least the same as, preferably greater than the overall coil width 27, preferably from about 1.05 to 2.5 times, more preferably 1.1 to 1.5 times, the width of the coil. Reference here to susceptor width includes the full width (combined width) of the active susceptors in the case where a slit susceptor is used, but excludes those portions of a susceptor that have been isolated to create "dead" zones or that are so narrow as not to be recognized by the induction tool. Wider susceptors could be used, but, except as noted below with respect to addressing concerns of induction tool misalignment, there is no performance benefit and the costs associated with the susceptors make them less desirable. If the susceptor width is smaller than the overall coil width then very strong edge heating occurs in the susceptor and edge burning or overheating will occur before or by the time that the center region is sufficiently heated to form a suitable carpet seam. This overheating results in damage to the secondary carpet backing, reducing strength, which may lead to carpet seam failure during stretching. Furthermore, there comes a point where the susceptor width is so small that the induction tool fails to recognize the susceptor altogether, much as noted above with the "dead zones. Thus, where a slit susceptor is used to activate the adhesive, the individual susceptor elements should be at least about ½, preferably at least about ⅔, the width of the coil.

Figure 8:
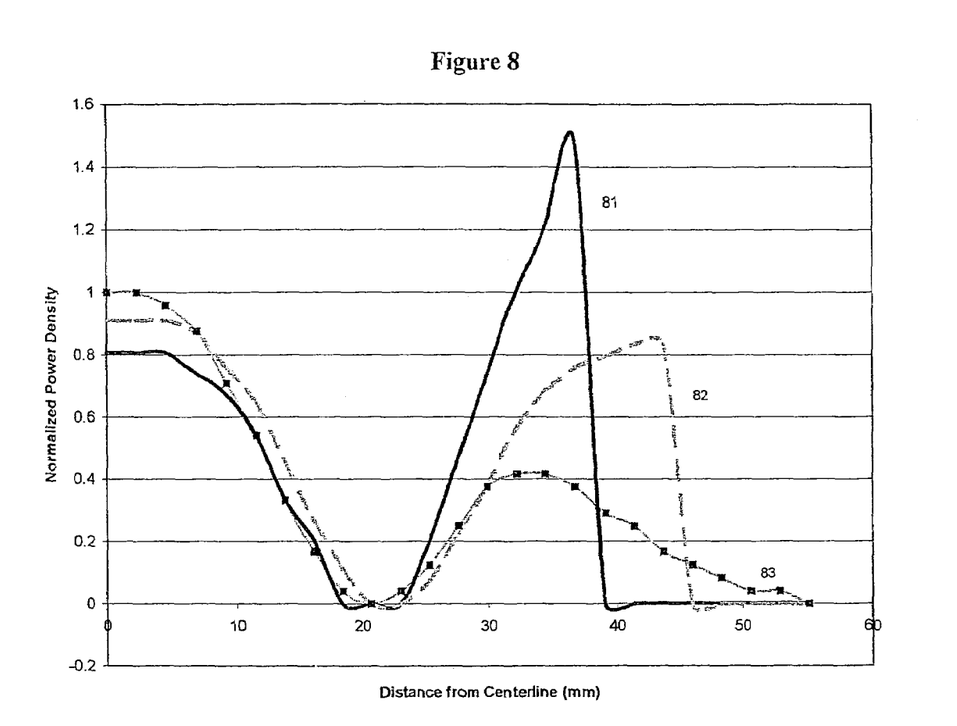
FIG. 8 is a graph showing a finite element analysis of the normalized power density across one-half of the width of the susceptor (from the centerline to the edge) for three different susceptor widths.

FIG. 8 illustrates the calculated results of a series of finite element analyses using the analysis program MEGA from the University of Bath, in the United Kingdom for tapes having susceptors of different widths when activated by a double racetrack induction coil having an overall width (denoted by number 27, in FIG. 4) of 78 mm. Plots 81, 82 and 83 correspond to susceptor widths of 80 mm, 90 mm and approximately 178 mm, respectively. Plot 81, which illustrates the normalized power density profile of a susceptor that is approximately 1.026 times the width of the coil, shows a high edge effect heating, nearly twice as much power density is delivered to the edge as to the centerline. Plot 82, which illustrates the normalized power density profile of a susceptor that is approximately 1.154 times the width of the coil, shows a relatively even heating between the centerline and the edge. Such heating characteristic is especially desirable. Finally, Plot 83, which illustrates the normalized power density profile of a susceptor that is approximately 2.24 times the width of the coil, shows good centerline heating with little edge effect heating. Such a power density profile is desirable, as noted above, where there is only a desire to bond at the centerline and/or no adhesive is found in the edge region of the susceptor. Depending upon the thickness and transition temperature of the adhesive, as well as the duration of activation of the tool, it is clear that susceptor width can play a major role in the efficacy of a seam.

Generally speaking, as noted above, the desired power density characteristic is where the power density at the centerline is equivalent to or nearly equivalent to the power density at the susceptor edge, especially where the adhesive thickness is relatively constant across the width of the tape or at least in the centerline and edge regions. Of course, some variation in the power density is not of concern and would be desired if the higher power density corresponded to a thicker region of adhesive. Still, since heat transfer from the susceptor to the adhesive and, perhaps more importantly, through the adhesive itself, is a limiting factor, there is the opportunity for excessive heat build up in regions of the susceptor having higher power density. Thus, very high power density is not necessarily desirable as the heat may not transfer quick enough to avoid scorching in the affected region. Additionally, since the thickness of the susceptor also affects energy absorption, thus power density buildup, it is also possible to vary the thickness of the susceptor in given regions to lessen the disparity in power density. Increasing susceptor thickness will decrease power dissipation (at a fixed coil excitation current). This, however, introduces other issues, including cost factors that may make this a less desirable alternative. In any event, given the sharp increase in power density at the edge between Plots 81 and 82, it is clear that while susceptors that have a width the same as the coil may be suitable, widths smaller than the coil will lead to unacceptable edge heating and failure.

The seaming tapes according to the preferred embodiment of this aspect of the present invention must have adhesive in both the centerline region and in the area overlying the edges of the susceptors, unless the susceptor is much wider, e.g., at least about 1.25, preferably at least about 1.5, times wider, than the coil width. This is because the adhesive overlying the edges of the susceptors acts as a heat sink, absorbing heat generated in the edge region. Generally speaking, even if the power density in the edge region is not sufficient to cause scorching, it is preferable to have the adhesive present at the edge region to provide an additional bond site for the tape. It may enhance the strength or appearance of the seam, e.g., there are some in the art who believe the creation of a bond of good strength removed from the main bond or seam area will help reduce some of the stresses on the primary seam and help alleviate peaking.

In a preferred embodiment, there are provided novel induction activatable seaming tapes comprising a base layer having a width of at least four, preferably at least 4.5 inches; a susceptor layer wherein the activatable susceptor is at least 3 and preferably at least 3.5 inches wide, a reinforcing layer, and at least one adhesive layer wherein the adhesive is present in the centerline region and comprises an adhesive strip or series of closely spaced, parallel beads in a region that is at least 1.5, preferably about 2 inches wide. Preferably, the tape will have adhesive in the ¼ to /1;2 inch section of the tape directly overlaying the edge of the activate susceptor. In a more preferred embodiment, the adhesive at the centerline and edges will be of sufficient thickness to allow the adhesive to work into the carpet backing and seam area. Though seaming tapes of less than four inches with an aluminum foil layer are commercially available for use in the hot iron seaming method where the foil provides a heat reflective surface, such tapes are too narrow to provide a sufficient bond band at the centerline without overheating the edges of the tapes. Applicants have found that by using wider tapes, they can create a tool or use a tool whose coil width, especially its centerline activation width, is sufficient to generate a suitably wide bond band area.

The method of forming the seams in accordance with this third aspect of the present invention is the same as set forth above for the other aspects. Activation times, energy levels, frequency, etc., is all a mater of choice and readily ascertainable by those skilled in the art, taking into consideration the factors mentioned in this disclosure. In a preferred aspect of the present invention, the induction tool will be a smart tool, capable of detecting energy consumption or draw by the susceptor and adjusting the output accordingly to ensure proper heating without over heating.

The foregoing discussion concerning the various aspects and embodiments of the present invention presumes, for the most part, that the tool is properly aligned with the centerline of the tape during activation of the tape, i.e., that central axis of the induction tool or coil, in the case of the double racetrack coil, is centered over the centerline of the tape. This is important inasmuch as misalignment of the tool relative to the centerline of the tape will adversely affect the optimal performance of the activation and, thus, the seam to be formed. To avoid such concerns, one may use an apparatus or tool which aligns the induction tool directly over the seam. Such tools are disclosed in U.S. Provisional Patent Application Ser. No. 60/443,403, filed Jan. 29, 2003, of Green et. al. Additionally, one could adapt alignment tools used for hot iron seaming methods to be used for induction tools as well, see e.g., Anderson, U.S. Pat. No. 4,584,040.

Alternatively, one can modify the widths of the tapes and susceptors to account for misalignment. In this respect, for each ¼ inch that the tool is aligned off of the centerline of the tape, the width of the susceptor will need to be an additional ½ inch wider overall. This is because the heating pattern for a given tool will shift equally with the misalignment, i.e., if the tool is misaligned by ⅓ inch, then the heating pattern is likewise misaligned by the same ⅓ inch. The need to increase the susceptor width to accommodate misalignment is particularly important, if not critical in the absence of an alignment tool or extreme skill, where the width of the susceptor is less than 1.1 times the width of the coil, perhaps even less than 1.2 times the width of the coil, depending upon the skill of the operator as well as the absolute dimensions of the tool and susceptor. For example, if the tool were of 4 inch width and the susceptor 4.8 inches (1.2 times the width of the coil), a misalignment of ¼ inch may not be an issue whereas a ½ inch misalignment may. Thus, in commercializing a tape for use with a given tool, one may want to accommodate a predetermined level of misalignment, by incorporating additional width into the susceptor to act as a tolerance for the misalignment. Again, by way of illustration, if the optimum susceptor width for a given tool, assuming exact alignment, is 1.1 times the width of the coil, but the likely skill is such that typically one could expect up to ½ inch misalignment, then the optimum susceptor width, for commercial purposes, will be 1.1 times the width of the coil plus 1 inch. Thus, the ranges of acceptable widths recited above for the susceptors would be adjusted accordingly, and such enhanced width tapes, systems and methods are and are intended to be encompassed by and embraced by the teaching of this patent and its claims. In these instances, wider gaps between the coils of the double racetrack coil and/or wider coil elements resulting in wider overall activation widths (28 in FIG. 4) are desirable to help offset concerns of misalignment.

Furthermore, while the foregoing discussion has focused on a proper alignment of the axis of the induction tool and coil with the centerline of the tape, it is also possible to bond and properly activate by having the axis of the induction tool perpendicular to the axis of the tape, particularly with tools whose coils are elongated, i.e., the length of the coils are considerably larger than their widths. This method of bonding is especially applicable and desirable for effecting bonding of the ends of the tapes. Thus, in one aspect of the seaming methods described above, the first activation may be one transverse or perpendicular to the tape to form the initial bond at one end of the tape followed by successive activations with the axis of the tool and the centerline being parallel until the tool reaches the opposite end of the tape where, once again, the tool is turn transverse to the tape to effect the last bond at that end of the tape. When using the induction tool in the transverse mode, adjustments must be made relative to the power and energy transfer to the tape to avoid excessive heating at the susceptor edge.

As another feature of the present invention, those skilled in the art would readily recognize that the tapes described herein can be modified to make the same two-sided for overlap seam bonding and for bonding the rolled good to an underlying substrate. In this respect, two tapes may be bonded back to back or one may build up the tape on both sides of the base layer.

Furthermore, while the methods described herein speak more often of a sequential activation and bonding, the seams of the present invention may also be made by a continuous seaming method where the tool is continuously or very rapidly activated or fired as the tool is moved along the seam at a constant rate.

Finally, again, while the invention has been described most prominently in terms of carpet seaming, it is clear that the same can be used or modified for use with any number of rolled goods and the like. Additionally, it is easily seen why the tapes, tools and seaming systems combining the tape and the tool as taught herein provide numerous benefits over existing technologies for seaming, particularly carpet seaming. It is also evident that these tapes, tools and systems are especially beneficial for making repairs to rolled goods, whether at the seam or in the body of the roll goods. For example, should a burn occur in a carpet, the section can easily be excised and replaced with another section of carpet. This is so for even very small sections of carpet to be replaced.

The following examples and comparative examples are provided to further illustrate the invention. These examples are not meant to limit the broad teaching and scope of the invention.

Unless otherwise indicated, the induction tool used in the following examples was of the type described in Reiss et. al. (U.S. Pat. No. 6,509,555) with the exception that the coil element of the tool was replaced with a double racetrack coil (See FIG. 4) wherein each coil element (21) had a functional length (25) of approximately 8 inches, an element width (26) of approximately ½ inch, with a coil gap (22) of approximately ½ inch and a total width (27) of about 3 inches. In preparing the seam, unless otherwise indicated, the axis of the tool (23) was aligned with the centerline of the tape and the tool activated a total of 9 times to deliver the energy specified in each example and to form a bond of approximately 8 inches in length corresponding to the activation length of the tool.

EXAMPLE 1

3½ Inch Tape with Inactive Areas to Prevent Squeeze Out

Two seaming tapes were prepared as follows. A 3½ inch wide, 0.000285 inch thick aluminum foil was laminated to a 3½ inch wide base sheet that is formed of unbleached, 30# Kraft paper. A 0.007 inch thick layer of adhesive (RHM494 available from Western Adhesives of Kansas City, Mo.) was applied to the surface of the foil using a heated iron. A 3 inches wide layer of woven cotton and fiberglass mesh was placed on top of the adhesive, centered and bonded to it using a warm iron. Another 0.007 inch thick layer of adhesive was applied to and bonded to the top surface of the fabric mesh using a heated iron. Two layers of ½ inch wide, 0.007 inch thick adhesive strips were applied to the edges of the tape and attached with a warm iron. The two tapes differed only in that on one tape, prior to the first application of adhesive, a cut was made through the aluminum foil, but not through the Kraft paper, approximately ¼ inch from each outer edge of the tape.

A 12 inch long piece of each tape was placed on top of a ½ inch thick carpet pad made of reclaimed polyurethane foam with the adhesive side facing away from the pad. Two pieces of beige Softbac carpet, each about 24 inches in length, (available from Shaw Industries) were overlaid on the tape and configured so that their edges met at the center of the tape.

The induction tool was placed on the top surface of the carpet over the tape having the cut foil and activated 9 times successively to deliver a total of 3600 J at 300 W. Upon examination of the back of the seam it was evident that the adhesive had melted and flowed into the backing of the carpet up to, but not beyond, the portion of the foil that was scored. The induction tool was then placed on the top surface of the carpet over the non-scored tape and activated 7 times successively to deliver a total of 2800 J at 300 W. Upon immediate examination of the back of the bonded seam, it was evident that the adhesive had melted and flowed beyond the width of the tape and bonded it to the carpet pad.

This example demonstrates that scoring or cutting the foil susceptor prevented it from heating and melting the adhesive thus preventing squeeze-out.

EXAMPLE 2

Slit Tape with Single Pancake Coil

Two seaming tapes similar in construction to FIG. 6 were prepared as follows. A 3½ inch wide, 0.000285 inch thick aluminum foil was laminated to a 3½ inch wide base sheet that was formed of unbleached, 40# Kraft. A 0.003 inch thick layer of adhesive (HM-075 available from Southern Chemical Formulators, Inc. of Mobile, Ala.) was applied to the aluminum surface using a heated iron. A 3 inch wide layer of woven cotton and fiberglass mesh was placed on top of the adhesive, centered and bonded to it using a warm iron. Another 0.003 inch thick layer of adhesive was applied and bonded to the top surface of the fabric mesh using a heated iron. Two layers of ½ inch wide adhesive strips, 0.003 inch thick, were applied to the edges of the tape and attached with a warm iron. The two tapes differed only in that on one tape, prior to the first application of adhesive, a cut was made through the aluminum foil, but not through the Kraft paper, along the centerline of the tape.

A 12 inch long piece of each tape was placed on top of a ½ inch thick carpet pad made of reclaimed polyurethane foam with the adhesive side facing away from the pad. Two pieces of beige Softbac carpet, each about 24 inches in length, (available from Shaw Industries) were overlaid on the tape and configured so that their edges meet at the center of the tape.

A single pancake type induction coil of Litz wire was wound in an elliptical shape measuring about 9 inches long and 3 inches wide. The coil was then attached to an induction tool of the type described in Reiss et. al. The device was set to deliver 4000 J at 400 W.

The induction tool was placed on the top surface of the carpet over the scored tape and activated to deliver a total of 4000 J at 400 W. Upon examination of front and back of the seam it was evident that the adhesive had melted and flowed into the seam and had bonded across the full width of the tape. The induction tool was then placed on the top surface of the carpet over the non-scored tape and activated to deliver a total of 4000 J at 400 W. Upon immediate examination of the back of the bonded seam, it was evident that the adhesive has not melted and flowed in the center of the tape.

This shows that scoring of the susceptor along the centerline allowed a traditional induction coil to sufficiently heat the center of region of the tape, thus enabling a strong bond at both the center and edge regions of the tape.

EXAMPLE 3

3½ Inch Double-Sided Tape to Seam Carpet and Bond to Floor

A double-sided tape was prepared by bonding together two single-sided tapes constructed as follows. A 3½ inch wide, 0.000285 inch thick aluminum foil was laminated to a 3½ inch wide base sheet that is formed of unbleached, 40# Kraft paper. The aluminum foil was then coated with a 0.003 inch thick layer of adhesive (HM-075 available from Southern Chemical Formulators, Inc. of Mobile, Ala.). Two layers of ½ inch wide, 0.003 inch thick, adhesive strips were applied to the edges of the tape and two layers of 1 inch wide, 0.003 inch thick adhesive film were applied to the center of the tape and attached with a warm iron. The single sided tapes were bonded to one another by applying spray adhesive to the paper backings and pressing them together to form the double-sided tape.

A 30 inch long piece of the double-sided tape was placed on top of a ¼ inch thick plywood board. Two pieces of beige Softbac carpet, each about 30 inches in length, (available from Shaw Industries) were overlaid on the tape and configured so that their edges met perpendicular to the center of the tape. The above-mentioned tool having a double racetrack induction coil of ½ inch coil spacing and 8 inches in overall length was placed on the top surface of the carpet over the tape and activated to deliver 4500 J at 500 W. Upon immediate examination of the bond, it was evident that the seam had been made and the carpet was securely bonded to the plywood.

EXAMPLE 4

3½ Inch Double-Sided Tape to Seam Textiles

A double-sided tape was prepared as in Example 3. A 12 inches long piece of the double-sided tape was placed between two 9 inches long cloth strips to form an overlap seam between the pieces of fabric. The induction tool was placed over the seam and activated to deliver 2500 J at 300 W. Upon immediate examination of the bond, it was evident that the seam had been made and the fabric pieces were securely bonded to one another.

EXAMPLE 5

3½ Inch Single-sided Low Profile Tape to Form Butt Carpet Seam

A 3½ inch wide, 0.000285 inch thick aluminum foil was laminated to a 3½ inch wide base sheet that is formed of unbleached, 40# Kraft paper. The aluminum foil was then coated with a 0.003 inch thick layer of adhesive (HM-075 available from Southern Chemical Formulators, Inc. of Mobile, Ala.). A 3 inches wide layer of woven cotton and fiberglass mesh was placed on top of the adhesive, centered and bonded to it using a warm iron. Another 0.003 inch thick layer of HM-075 was applied to and bonded to the top surface of the fabric mesh. Two layers of ½ inch wide, 0.003 inch thick adhesive strips, were applied to the edges of the tape and two layers of 1 inch wide, 0.003 inch thick, adhesive film were applied to the center of the tape and attached with a warm iron.

A 12 inch long piece of this tape was placed on top of a ½ inch thick carpet pad made of reclaimed polyurethane foam with the adhesive side facing away from the pad (toward the carpet backing). Two pieces of beige Softbac carpet, each about 24 inches in length, (available from Shaw Industries) were overlaid on the tape and configured so that their edges met at the center of the tape. The induction tool was placed on the top surface of the carpet over the tape and activated to deliver 4000 J at 400 W (10 second activation). Upon immediate examination of the bond, it was evident that the adhesive had melted and flowed into the backing of the carpet.

This procedure was repeated again on a larger piece of carpet and the induction tool was used to activate the adhesive tape ahead of the carpet installer. The installer activated the tape, slid the tool approximately 7 inch to the next location, activated it again, and while waiting for the subsequent activation, briefly inspected the carpet to ensure the desired seam was produced and found that the work necessary to create the desired seam was less time-consuming than with the hot iron method. This procedure was very similar to the procedure used today with the added benefits described above. After the seam was complete, the adhesive was allowed to cool without examination of the bond. The carpet was stretched with a power stretcher and placed on tack strips designed to secure carpet to flooring. The seam remained intact throughout the operation and upon visual examination, appeared to be of higher quality than one produced adjacent to it using the traditional hot iron method.

EXAMPLE 6

3½ Inch Single-sided Tape with Excess Adhesive at Edges and Center

A tape was prepared in accordance with Example 5 following which a bead of adhesive (HM-049 available from Southern Chemical Formulators, Inc. of Mobile, Ala.) inch diameter was affixed to the center of the tape using an aerosol adhesive.

A 12 inch long piece of this tape was placed on top of a ½ inch thick carpet pad made of reclaimed polyurethane foam with the adhesive side facing away from the pad. Two pieces of beige Softbac carpet, each about 24 inches in length, (available from Shaw Industries) were overlaid on the tape and configured so that their edges met at the center of the tape. The induction tool was placed on the top surface of the carpet over the tape and activated to deliver 4000 J at 400 W. Upon immediate examination of the bond, it was evident that the central bead of adhesive had melted and flowed onto the edges of the carpet backing.

EXAMPLE 7

Conventional Hot Iron Tapes v. Induction Tape

In this example three commercially available 3.75 inch wide hot iron seaming tapes, each having an aluminum foil layer incorporated into and extending the full width of the backing to reflect heat passing through the hot melt from the iron and thus, presumably, enhancing melt of the hot melt adhesive, and an adhesive layer that provided an adhesive free edge of about ½ wide along each edge of the tape, a 1.9375 inch wide electrically activated seaming tape having a 0.002 inch conductive foil layer for resistive heating and a 4.5 inch wide induction activatable seaming tape made in accordance with the teaching of the present invention were evaluated to assess their activation by induction. The three commercial tapes were Bond Loc 90LTG, Roberts GT330 and Seam Master Gold.

A 12 inch long piece of each tape was placed on top of a ½ inch thick carpet pad made of reclaimed polyurethane foam with the adhesive side facing away from the pad (toward the carpet backing). Two pieces of beige Softbac carpet, each about 12 inches in length, (available from Shaw Industries) were overlaid on the tape and configured so that their edges met at the center of each tape. In these series of experiments, the double racetrack induction tool had a coil separation or gap of about ⅝ inch and a total coil width of about 3⅝ inches. The induction tool was placed on the top surface of the carpet over the tape and activated to deliver 3500 J at 600 W.

Examination of the seams formed with the three commercial hot iron tapes showed visible signs of paper charring and damage to the carpet, evidence of overheating in the edge region of the reflective foil. Without adhesive overlying the edges of the reflective foil, there is no heat sink, other than the paper backing and carpet, to absorb the heat generated in the foil edge. The centerline area of the tape showed poor and intermittent melting of adhesive, indicative of an incomplete seam with little or poor strength. Because of the limited width and thickness of the conductive element of the resistance tape, the induction tool failed to recognize the tape and did not deliver any energy to the tape. On the other hand, the tapes made in accordance with the teaching of the present invention showed no signs of charring or overheating but excellent activation, thus melting of adhesive, in the centerline region of the tape.

It should be understood that the foregoing description is only illustrative of the invention. Various alternatives and modifications can be devised by those skilled in the art without departing from the invention. Accordingly, the present invention is intended to embrace all such alternatives, modifications and variances falling within the scope of the appended claims.

We claim:

1. A bonding tape comprising a base layer, an electro-responsive material centered on the base layer and extending in both directions from the centerline of the base layer to an edge that is from ½ to ¼ inch from the edge of the base layer and two edge strips of a damming material, each edge strip overlying the whole or a portion of the base layer in the two regions between the edges of the tape and the edges of the electro-responsive material, and an adhesive layer in heat transfer relationship with said electro-responsive material, said adhesive layer overlying all or a portion of the electro-responsive material.

2. The banding tape of claim 1 wherein the electro-responsive material is selected from an induction activatable susceptor and a conductive resistance element.

3. The bonding tape of claim 1 wherein the composition of the electro-responsive material and the damming material are the same and the edge strips are formed by scoring the electro-responsive material so as to electrically isolate edge portions of the electro-responsive material from the center portion, thereby creating heat sink strips.

4. The bonding tape of claim 1 wherein the adhesive overlies all or a portion of the damming material as well.

5. The bonding tape of claim 1 wherein the electro-responsive material comprises two individual electro-responsive elements separated by a gap running along its axis at or proximate to the centerline of the base layer.

6. The bonding tape of claim 1 wherein the tape is induction activated and the electro-responsive material is a susceptor.

7. The bonding tape of claim 1 wherein the tape is electrically activated and the electro-responsive material is an electrical conductor that generates heat by resistance.

8. The bonding tape of claim 1 wherein the damming material acts as a heat sink.

9. The bonding tape of claim 1 wherein the electro-responsive material is at least 4 inches wide.

10. A bonding system comprising:
   (a) an induction activatable seaming tape comprising a base layer, a susceptor centered on the base layer and extending in both directions from the centerline of the base layer to an edge that is from ½ to ¼ inch from the edge of the base layer and two edge ships of a damming material, each edge strip overlying the whole or a portion of the base layer in the two regions between the edges of the tape and the edges of the susceptor, and an adhesive layer in heat transfer relationship with said susceptor, said adhesive layer overlying all or a portion of the susceptor, and
   (b) an induction tool whose axis, in operation, parallels the centerline of the base layer comprising an induction coil whose width is the same as or less than the width of the susceptor.

11. The bonding system of claim 10 wherein the susceptor comprises two individual susceptor elements separated by a gap running along its axis at or proximate to the centerline of the base layer.

12. A bonding system comprising:
   (a) an induction activatable seaming tape comprising a base layer, a susceptor overlaying all or a substantial portion of the base layer and capable of generating heat upon exposure to electromagnetic energy and an adhesive layer in heat transfer relationship with said susceptor, said adhesive layer overlying all or a portion of the susceptor; and
   (b) an induction tool wherein the coil is a double racetrack coil whose coil elements are in a side-by-side relationship relative to and on opposite sides of the axis of the induction tool.

13. The bonding system of claim 12 wherein the coil of the induction tool has a coil spacing of from about 5 to 30 mm and coils loop elements of about 0.25 inch to about 0.75 inch wide and wherein the susceptor is from about 1.05 to about 2.5 times the overall width of the coil.

14. The bonding system of claim 12 wherein the susceptor is at least about 4 inches wide.

15. The bonding system of claim 12 wherein the adhesive is thicker in the centerline region of the tape or in both the centerline region and the region of the tape overlying the edges of the susceptors.

16. The bonding system of claim 12 wherein the coil elements are pancake coils.

17. An improved induction tool wherein the improvement is a double racetrack coil element with each portion of the coil element in a side-by-side relationship relative to and on opposite sides of the axis of the induction tool, said double racetrack coil clement having a coil spacing of at least about 5 mm and coil loop elements of at least about 0.25 inch wide.

18. The improved induction tool of claim 17 wherein the coil spacing is from about 5 to about 40 mm and the coil elements are from about 0.25 to about 0.75 inches wide.

19. The improved induction tool of claim 17 wherein the coil elements are made of Litz wire.

20. The improved induction tool of claim 17 wherein the overall width of the double racetrack induction coil is from about three to about six inches wide.

* * * * *